United States Patent [19]
Wilson

[11] Patent Number: 6,138,399
[45] Date of Patent: Oct. 31, 2000

[54] COILED FISHING LURE WORM AND METHOD OF USING THE SAME

[75] Inventor: Scott Wilson, Deland, Fla.

[73] Assignee: Bost Enterprises, Fairfield, Conn.

[21] Appl. No.: 09/479,034

[22] Filed: Jan. 7, 2000

Related U.S. Application Data

[60] Provisional application No. 60/126,827, Mar. 30, 1999.

[51] Int. Cl.[7] .................................................. A01K 85/00
[52] U.S. Cl. .......................... 43/42.24; 43/42.1; 43/42.28
[58] Field of Search ........................ 43/42, 42.1, 42.02, 43/42.24, 42.26, 42.28, 42.29, 42.3

[56] References Cited

U.S. PATENT DOCUMENTS

| | | |
|---|---|---|
| 1,701,528 | 2/1929 | Clewwell . |
| 2,690,026 | 9/1954 | King ........................................ 43/42.02 |
| 3,037,316 | 6/1962 | De Zeeuw .............................. 43/42.28 |
| 3,100,360 | 8/1963 | Creme .................................... 43/42.02 |
| 3,158,952 | 12/1964 | Creme .................................... 43/42.24 |
| 3,349,513 | 10/1967 | Jeff ........................................ 43/42.02 |
| 3,959,912 | 6/1976 | Lee ........................................ 43/42.02 |
| 3,964,203 | 6/1976 | Williams, Jr. ......................... 43/42.02 |
| 4,047,318 | 9/1977 | Mapp .................................... 43/42.24 |
| 4,138,792 | 2/1979 | Hill ....................................... 43/42.24 |
| 4,316,343 | 2/1982 | Creme .................................... 43/42.24 |
| 4,516,352 | 5/1985 | Firmin ................................... 42/42.26 |
| 4,592,161 | 6/1986 | Smith et al. ........................... 43/42.24 |
| 4,619,069 | 10/1986 | Strickland ............................. 43/42.26 |
| 4,653,212 | 3/1987 | Pixton ...................................... 43/4.5 |
| 4,870,775 | 10/1989 | Schrader ................................ 43/42.02 |
| 4,885,867 | 12/1989 | Leal ...................................... 43/42.26 |
| 4,890,412 | 1/1990 | Tsao et al. ............................. 43/42.24 |
| 4,926,578 | 5/1990 | Morse et al. .......................... 43/42.24 |
| 4,998,372 | 3/1991 | Reed ..................................... 43/42.24 |
| 5,121,567 | 6/1992 | Boone ................................... 43/42.24 |
| 5,379,544 | 1/1995 | Davidson .............................. 43/42.24 |
| 5,465,523 | 11/1995 | Garst ..................................... 43/42.24 |
| 5,943,811 | 8/1999 | Packer ................................... 43/42.24 |

*Primary Examiner*—Jack W. Lavinder
*Attorney, Agent, or Firm*—David P. Gordon; David S. Jacobson; Thomas A. Gallagher

[57] ABSTRACT

A fishing lure includes a thicker head portion which receives a hook and a thinner tail portion which has a width to thickness (height) ratio of at least two to one. The head and tail portions are integrally molded from a soft, flexible material such as plastic with shape-retaining properties, with a portion of the tail nearest the head extending through at least a one hundred and eighty degree curve such that the tail will curve or coil over the head (in a plane that is perpendicular to the width) when the lure is not being pulled through the water. In a preferred embodiment, the fishing lure is formed as a coil which traverses at least one complete turn. The shape-retaining plastic preferably has a lower specific gravity than water to give the lure excellent floatation characteristics.

33 Claims, 4 Drawing Sheets

COILED FISHING LURE WORM AND METHOD OF USING THE SAME

This application hereby claims priority from Provisional Application No. 60/126,827 filed on Mar. 30, 1999.

BACKGROUND OF THE INVENTION

1. Field of the Invention

This invention relates broadly to fishing equipment. More particularly, this invention relates to fishing lures which are designed to simulate the movement of live bait.

2. State of the Art

Fishermen have for centuries attempted to design or discover the perfect bait to lure their intended catch, such as bass, to their hook. Fishermen know that fish are instinctively attracted to the movement of live bait. Unfortunately, it is not always possible or convenient for a fisherman to carry or fish with live bait. Further, live bait is more expensive to use, is not always readily available, and is difficult to skewer with a barbed hook without unintentionally killing the bait or greatly reducing its ability or desire to move normally.

Over the years, fishing equipment manufacturers have made numerous attempts to perfect an artificial fishing lure which simulates characteristics of a variety of types of live bait. The lures are generally molded from soft plastic to closely simulate the look of the particular bait animal. While manufacturers of such lures have succeeded in designing artificial bait with an extremely life-like appearance, they have not been completely successful at designing artificial bait which simulates the movements of live bait in actual use. For example, U.S. Pat. No. 3,100,360 of Creme and U.S. Pat. No. 3,158,952 of Creme show attempts to design artificial worms which look like live worms and which attempt to simulate the movement of live worms. The '360 patent describes a coiled worm-like lure having simulated worm markings and a bifurcated tail portion. Because the worm is molded in a partially coiled position, the lure gyrates in a somewhat spiral path, attempting to simulate a worm-like movement when the lure is being dragged through the water. The '952 patent describes an artificial worm lure which simulates a worm coiled on a flat surface. While the tail of the lure flaps about when the lure is dragged through the water, the lure is designed to immediately return to a coiled position once the dragging force on the lure has ceased. While both the '360 and the '952 artificial lures simulate both the look of a live worm and the movement of a live worm to some degree when the lure is being dragged through the water, neither continues to simulate the movement of a live worm after the dragging force applied to the lure has ceased. Once the lure ceases to move, the fish are generally less attracted to it. Even after movement of the lure is resumed, the fish are generally no longer interested and are therefore less likely to strike at it.

SUMMARY OF THE INVENTION

It is therefore an object of the invention to provide a fishing lure in the size and shape of a worm which simulates the general look of a live worm in the water.

It is another object of the invention to provide a fishing lure in the size and shape of a worm which simulates the movement of a live worm in the water.

It is a further object of the invention to provide a fishing lure in the size and shape of a worm which continues to simulate the movement of a live worm having a more life-like worm-like recoil response while returning to a coiled position after a dragging force is no longer applied to the fishing lure.

In accord with these objects, which will be discussed in detail below, a fishing lure is provided and generally comprises a thicker head portion which receives a hook and a thinner tail portion which has a width to thickness (height) ratio of at least two to one. The head and tail portions are integrally molded from a soft, flexible material (e.g. plastic) with shape-retaining properties, with a portion of the tail nearest the head extending through at least a one hundred and eighty degree curve such that the tail will curve or coil over the head (in a plane that is perpendicular to the width) when the lure is not being pulled through the water. Preferably, the fishing lure is formed as a coil which traverses at least one complete turn. The shape-retaining plastic preferably has a lower specific gravity than water to give the lure as a whole (and certain portions of the lure specifically) excellent floatation characteristics.

According to various preferred aspects of the invention, the head portion of the lure is formed having a first end which tapers to a point to keep the lure from catching on weeds or other objects while being fished, and the head portion preferably includes a first hook receiving portion positioned near the first end to which a fishing hook may be attached. A second hook receiving portion to which a fishing hook may be attached is optionally provided and positioned on a portion of the head nearer the tail. Except for the tapering portion, the head of the lure preferably maintains a substantially constant width along its entire length and coils slightly. The head of the lure is preferably provided with a width which is significantly (e.g., at least twice) greater than its thickness to ensure that the lure coils in a plane that is perpendicular to the larger dimension.

The tail portion of the lure is designed having a top side, a bottom side, a width which preferably tapers toward a tail end, and a length which is preferably formed as a series of hinged segments. Each segment is separated by a hinge formed from material remaining after a pair of corresponding narrow grooves are carved in both the top side and the bottom side of the second portion. The hinges between the segments allow the generally coiled second portion of the lure to bend and flex thereby allowing the second portion of the lure to straighten when the lure is pulled through the water and recoil slowly when the lure is stationary.

According to one embodiment, the hinges of the tail portion of the lure vary in thickness along the length of the tail, thereby allowing certain segments of the tail to begin rising and recoiling more quickly than other segments. Similarly, the thicknesses and lengths of the series of hinged segments may also vary along the length of the tail.

During manufacture, the lure is integrally formed with "locking" members which hold the head and tail in a coil and which may be easily removed by pinching. The head member is coiled around a generally cross-shaped member such that the head forms an inner-most coil. Additional locking tabs between the head and the tail are used to cause the tail portion to wrap around the head and form an outer-most coil. Storing the lure with the locking device helps the lure retain its coiled form, prevents the coil from being stretched or compressed, and prevents unwanted kinks and bends from forming in the lure when the lure is stored. This is important because soft plastics often take a set in undesirable positions if not properly stored, which in this case could keep the lure from having its optimum movement capabilities when being fished.

In a first preferred rigging of the lure, a hook having a weedguard and a flattened weight is used to keep the lure in a position such that the lure will recoil as designed in a plane perpendicular to the bottom. The hook which has a barb with a point is inserted into a generally bulbous hook receiving portion on the head portion and is rotated and manipulated until the point projects forward and outward and the shaft of the hook is below the lure. The thickness and shape of the bulbous hook receiving portion helps prevent the lure from turning or rotating on the point of the barb.

Alternately, according to a second preferred rigging of the lure commonly referred to as a Texas rigging, a barbed hook is inserted through a second bulbous hook receiving portion located on the head near the tail. The hook is initially inserted into the first bulbous hook receiving potion of the lure and maneuvered such that an unbarbed end of the hook projects forward from the head of the lure and the barbed end of the hook is directed toward the tail. The barb of the hook is then inserted into and secured into the second bulbous hook receiving portion.

The preferred use of the lure begins after attaching the lure to a line of a fishing pole, casting the lure into the water, and allowing the lure to gradually descend toward the bottom. The lure is fished by first pulling it slowly through the water along the bottom for approximately a foot, and allowing the coiled lure to unfurl into a generally flat position. When the forward movement applied to the lure stops, the self-actuating motion of the lure starts. The preferred embodiment is designed to continue to move for approximately ten seconds on its own in a way that resembles the movement of a live worm. The self-actuating motion begins as the proximal end of the tail rises higher and faster than the distal end of the tail. As the distal end of the tail catches up and rises above the proximal end of the tail, the distal end of the tail exhibits a desirable wobbling motion as the hinges of the tail segments try to force the broad surface of the tail through the water. As the tail continues to rise, it curls forward past the body portion. Often, the tail then begins to slowly turn and move in a lateral direction before finally curling into itself. This turning gives the lure a worm-like probing movement. Once the lure stops moving on its own, the lure can be once again pulled slowly along the bottom for a short distance and the fishing process repeated.

The fishing lure of the invention simulates the general shape, appearance, and life-like movement of a live worm moving about in the water and maintains a worm-like movement for a period of time after the lure is no longer being dragged through the water. Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
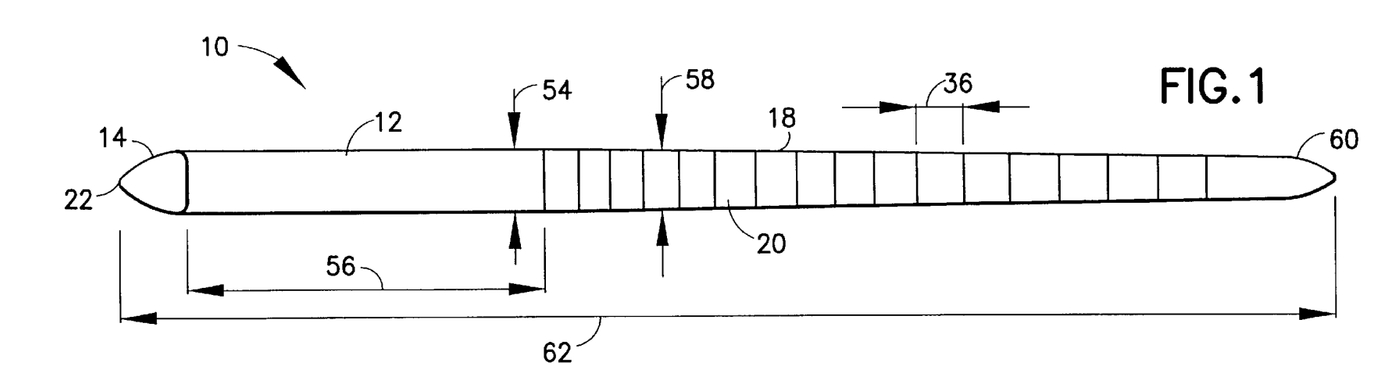
FIG. 1 is a top view of a first embodiment of the fishing lure of the invention in a generally flattened state.
Figure 2:
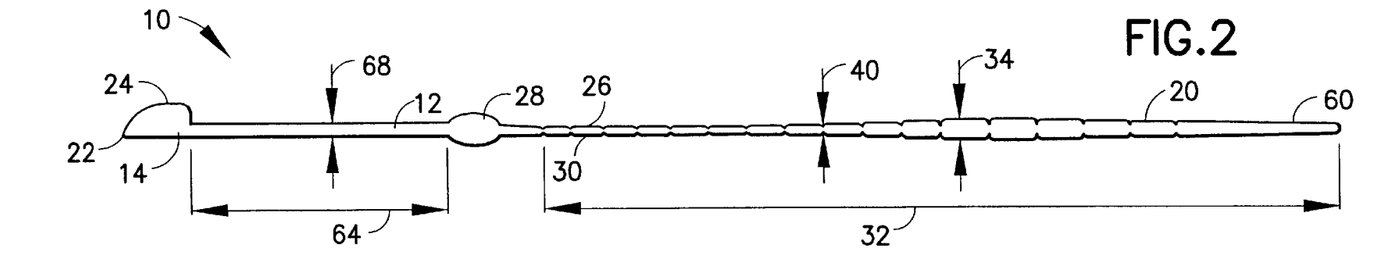
FIG. 2 is a side view of the fishing lure of FIG. 1.

The preferred embodiment of the fishing lure 10 of the invention is seen in FIGS. 1 and 2 in a flattened state. The lure 10 generally includes a first head (or head/body) portion 12, and a second portion 18 (or tail) attached to the first portion 12, and formed as a series of hinged segments 20. The head portion 12 of the lure 10 preferably include an end portion 14 which tapers to a point 22 to help prevent the lure 10 from catching on weeds or other objects while being fished. The tapering end portion 14 is preferably sufficiently thick so as to constitute a first hook or barb receiving portion 24 which protrudes from a bottom side 26 of the fishing lure 10. If desired, the head portion 12 may be provided with a second hook-receiving portion 28 which protrudes (generally symmetrically) from both a top side 30 and the bottom side 26 of the fishing lure 10.

The second (tail) portion 18 of the lure is formed as a series of hinged segments 20 which vary in thickness 34 and length 36 along the length 32 of the tail. In the embodiment of FIGS. 1 and 2, the thicknesses 34 of the hinged segments 20 vary from approximately 0.05 inches to approximately 0.125 inches. It is desirable with respect to the overall worm-like movement of the lure 10 that the hinged segments 20 be sufficiently thick to provide a desired lateral rigidity (which helps to keep the lure 10 in the same plane while it is recoiling by avoiding premature twisting of the lure), yet not be so thick as to restrict the tail 18 of the lure 10 from its slow turning recoil motion when the lure 10 nears the end of its range of movement. In addition, as will be described in more detail hereinafter with respect to FIGS. 3 and 7a–7c, it is desirable that certain hinged segments located further from the head be thicker than certain segments located closer to the head so that the tail can float and coil in a worm-like motion, as the thicker segments will rise more quickly than the thinner segments.

Figure 3:
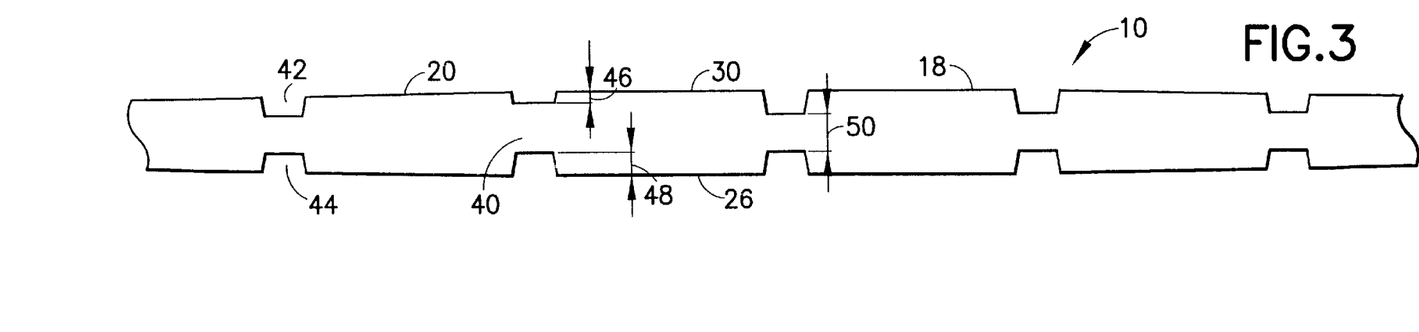
FIG. 3 is a partially broken enlarged side view of a plurality of hinged segments of the fishing lure of FIG. 2.

As seen in FIG. 3, the segments 20 of the tail portion 18 are separated by hinges 40 formed between the segments 20. The hinges 40 are defined by a pair of corresponding narrow grooves 42, 44 formed on the tail portion 18 at varying locations along its length 32. One of the corresponding pair of grooves 42, 44 is formed on the top side 30 of the lure 10 and the other is formed on the bottom side 26 of the lure 10. The hinges 40 give the generally coiled tail portion 18 more flexibility to bend and flex; particularly where the tail gets thicker. With added flexibility, the tail can easily straighten when the lure 10 is pulled through the water. Furthermore, the added flexibility of the hinges reduces the recoil strength of the tail. This causes the lure to recoil slowly, thereby simulating the coiling of a live worm.

Figures 4, 5, 6, 10, 11:
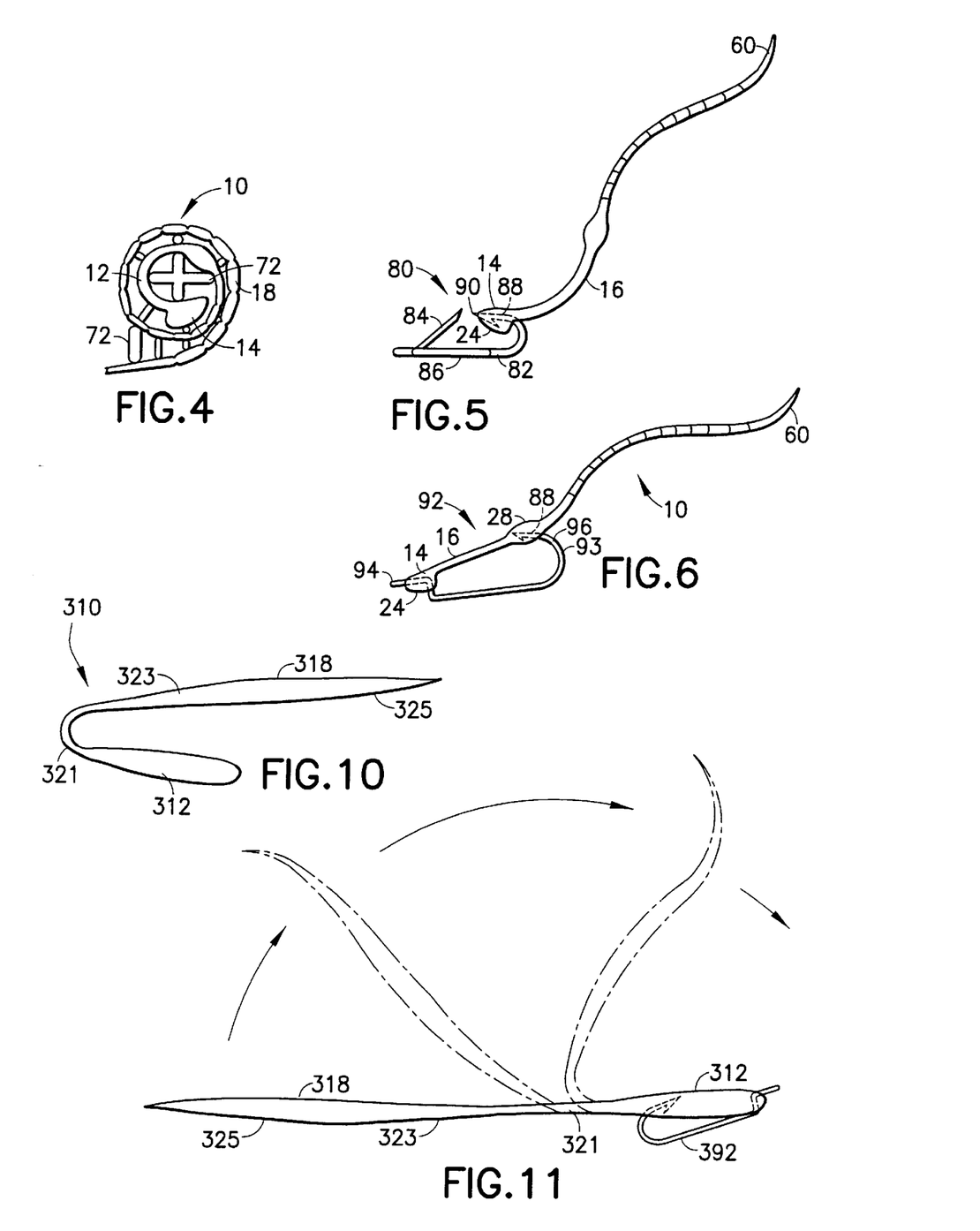
FIG. 4 is a top view of the fishing lure of FIG. 1 coiled about a locking device.
FIG. 5 is a side view of the coiled fishing lure of FIGS. 1 and 2 in tandem with a fishing hook and weight rigged according to a first preferred rigging.
FIG. 6 is a side view of the coiled fishing lure of FIGS. 1 and 2 in tandem with a fishing hook rigged according to a second preferred rigging.
FIG. 10 is a top view of a third embodiment of the invention.
FIG. 11 is a top view of the third embodiment of the invention when being dragged through the water and at first and second times after the dragging force on the lure has ceased.

The depths 46, 48 of the grooves which define the hinges 40 between the segments 20 can play a role in the recoil action of the lure 10. The shallower the groove depths 46, 48, the greater the hinge thickness 50; and the greater the hinge thickness the stronger the restoring force and the faster the recoil action. Similarly, the deeper the groove depths 46, 48, the smaller the hinge thickness 50; and the smaller the hinge thickness 50, the weaker the restoring force and the slower the recoil action. It will also be appreciated that the higher the Durometer plastic utilized to form the hinged segment 20, the stronger the restoring force and the faster the recoil action. A softer plastic will have a weaker restoring force and a slower recoil action. Furthermore, the radius of formation affects the recoil strength, with a smaller radius curve providing a larger recoil strength than a larger radius curve According to the first embodiment, the hinges 40 preferably vary in hinge thickness 50 along the second portion length 32 giving certain segments 20 a greater degree or strength of movement than other segments 20. For example, in the preferred embodiment, the tail portion 18 has at least seventeen hinged segments 20 formed from soft polyvinylchloride (PVC). In the preferred embodiment, the hinges 40 which differentiate the first six segments 20 of the tail 18 are 0.045 inches thick; the hinges 40 which differentiate the next four segments 20 are 0.040 inches thick; the hinges 40 which differentiate the next four segments are 0.035 inches thick; and the hinges 20 which differentiate the last three segments 20 are 0.030 inches thick. Hinge thickness 50 is important to the worm-like movement of the lure 10, because segments 20 having thicker hinges rise (and coil) more quickly than segments 20 with thinner hinges (as indicated by FIG. 5).

It is also understood that the depth(s) 46 of the grooves on the top side 30 of the lure 10 may be different than the depth(s) 48 on the bottom side 26 of the lure.

According to the first embodiment of the invention, and as previously mentioned, the head portion 12 of the lure tapers at its end 14, but otherwise maintains a substantially constant width 54 along its length 56. The tail portion, on the other hand, preferably tapers in width toward its tail end 60. According to the first embodiment of the invention, the width 54 of the head 14 is preferably approximately ⅜" wide and the width 58 of the tail tapers from approximately ⅜" to ¼" at the tail end 60. The length 56 of the head preferably ranges from ten to forty percent of the total length 62 of the lure 10. For example, in the first embodiment, the overall length 62 of the lure is approximately seven inches, with the length of the head 14 being approximately two and a half inches, and the length of the tail approximately four and a half inches.

In the first embodiment, the width 54 of the non-tapered portion of the head 14 is typically at least twice the thickness 68 of the head, (and is preferably at least two and a half or three times or more the thickness of the head). In this manner, the lure 10 will recoil in a plane perpendicular to the width 54. Also, according to the preferred embodiment, the head tapers in thickness 68 from approximately 0.11 inches adjacent the end 14 to approximately 0.08 inches adjacent to the second hook receiving portion 28. However, it should be appreciated that the head (between portions 14 and 28) can be of a constant thickness or can have different thicknesses.

According to a preferred aspect of the invention, the head portion 12 of the lure 10 is designed to have a greater recoil strength than the tail portion 18. The recoil strength of the head portion 12 in part is due to the relatively large thickness 68 compared to the relatively smaller thicknesses 40 of the hinges, and in part is due to the fact that the head portion 12 of the preferred embodiment is formed on an inside curve of a coil (as seen in FIG. 4); i.e., the coil radius is smaller for the head portion than for the tail portion.

Turning now to FIG. 4, a top view of a preferred embodiment of a coiled fishing lure 10 is shown secured in a locking device having a plurality of locking members 72 which help maintain the coiled shape of the lure and prevent unwanted kinks and bends from forming in the lure 10 when stored. The fishing lure 10 is preferably integrally molded in a generally coiled form from a soft, flexible material with shape retaining properties, such as a soft plastic (although harder plastics and materials can be utilized). The coiled form and the shape retaining properties of the plastic help give the coiled fishing lure 10 worm-like movement when fished. Properly storing the coiled fishing lure 10 prior to use is important because soft plastics often take a set in an undesirable position if not properly stored, which in this case could keep the lure 10 from having its optimum movement capabilities when being fished. Thus, the lure is preferably manufactured and stored until use about the locking members 72 by forming the locking members 72 during manufacture integrally with the lure. The first portion 12 of the lure 10 beginning with the head 14 is coiled about an inner (plus-shaped) locking member such that the first portion forms an inner loop. The tail portion 18 is secured as an outer loop about the inner loop, with several locking members 72 joining the inner and outer loops. Prior to use, the lure 10 is detached from the locking members 72, and any excess plastic from the locking members 72 is preferably removed.

As previously mentioned, the Durometer of the material used to form the coiled fishing lure 10 will partially determine the duration of the movement of the lure 10 after the lure 10 is no longer being dragged through the water. Specifically by way of example, using the lure industry's generally accepted classifications of "soft", "medium", and "hard" lure plastic, and using the dimensions of the preferred embodiment of the invention with respect to hinge thicknesses, etc., when the coiled fishing lure 10 designed as set forth with respect to FIGS. 1–4 is formed from a "hard" flexible lure plastic of Durometer 3 to 7 on the Shore A Scale (which is still very soft in the range of plastics generally), the lure 10 maintains worm-like movement for approximately 5–7 seconds; when the lure 10 is formed from a "medium" flexible lure plastic of Durometer 1 to 3 on the Shore A Scale, it maintains worm-like movement for approximately 7–10 seconds; and when the lure 10 is formed from a "soft" flexible lure plastic of Durometer 0 to 1 on the Shore A Scale, it maintains worm-like movement for approximately 10–14 seconds after a force is no longer applied to the lure 10.

Further, it is desirable that the shape retaining plastic have a lower specific gravity than water to give the lure 10 as a whole (and certain portions of the lure specifically) better floatation characteristics. The lower specific gravity of the material of the lure 10 contributes to the vertical lift of the lure 10 in water. The added vertical lift in turn helps the lure 10 recoil in a single plane, thereby avoiding premature recoiling. The increased floatation also causes the lure 10 to hang or remain high in the water momentarily so fish can see it better, and also contributes to the slow turning motion exhibited by the lure 10.

Referring to FIG. 5, a first preferred rigging 80 of the lure 10 is seen. The rigging 80 includes a hook 82 having a weedguard 84, a flattened weight 86 (used to keep the lure 10 in a position such that the lure 10 will recoil as designed in a plane perpendicular to the bottom), and a barb 88 with a point 90. The barb 88 is inserted into the head 14 from beneath and is pushed forward until the point 90 projects outward. The dimensions and shape of the head 14 of the lure 10, including the first hook receiving portion 24, help prevent the lure 10 from turning or rotating on the barb point 90. The shape of the head 14 also allows the body 16 of the lure 10 to extend directly back and opposite the direction in which the hook 82 is being pulled such that the lure can uncoil into a flat position behind the hook.

Alternately, a second preferred rigging 92 of the lure 10 commonly referred to as a Texas rigging is shown in FIG. 6. The second rigging 92 includes a barbed hook 93 with an unbarbed end 94 and a barbed end 96. The hook 93 is inserted through both the first hook-receiving portion 24 and the second hook-receiving portion 28 by initially inserting the barbed end 96 into and out portion 24 of head 14, sliding the lure up the length of the hook until the unbarbed end 94 projects forward from the head, and inserting the barbed end 94 of the hook 82 through the second hook-receiving portion 28 such that it projects toward the first hook-receiving portion 24.

Figure 7A:
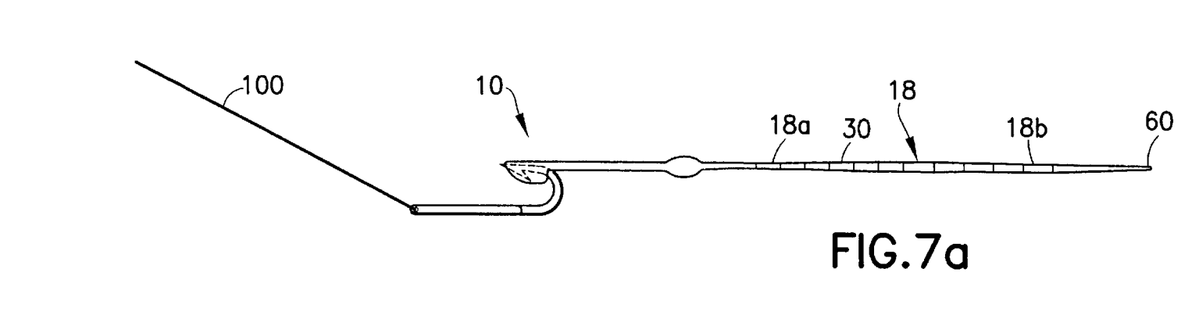
FIG. 7a is a side view of the fishing lure of FIG. 1 as the lure is initially being dragged through the water.
Figure 7B:
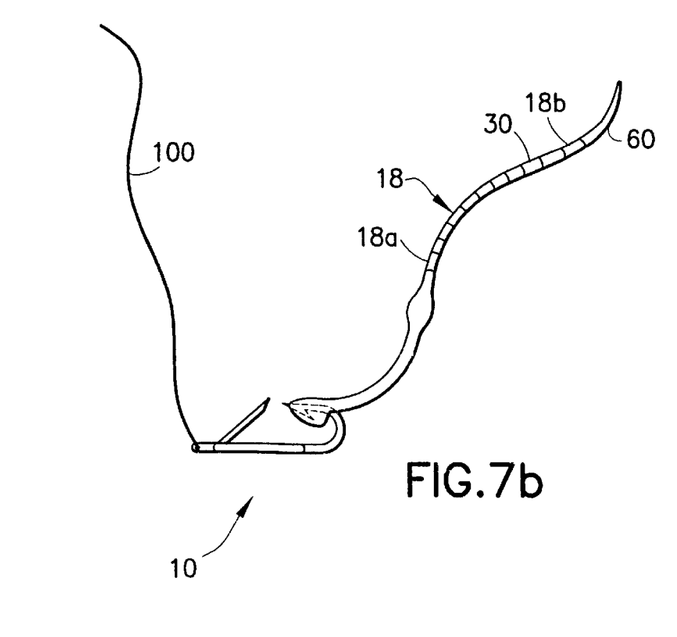
FIG. 7b is a side view of the fishing lure of FIG. 7a a short time after the dragging force on the lure has ceased.
Figure 7C:
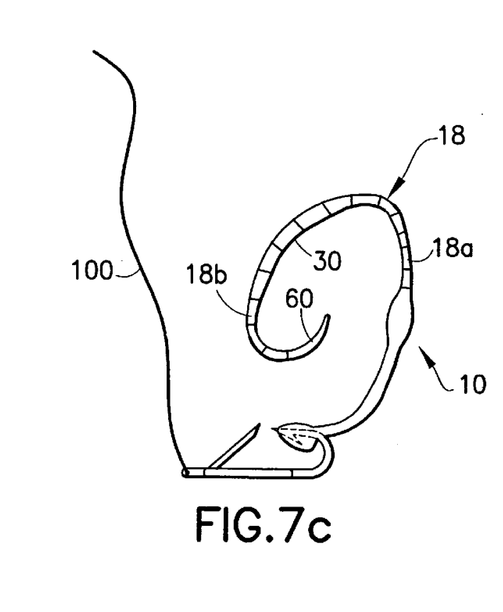
FIG. 7c is a side view of the fishing lure of FIG. 7a as the lure is recoiling.

Referring to FIGS. 7a–7c, the preferred use of the lure 10 begins after attaching the lure 10 to a line 100 of a fishing pole (not shown), casting the lure 10 into the water, and either allowing the lure 10 to hit the bottom (not shown) or allowing the lure 10 to reach a depth where it is advantageous to fish the lure 10. The lure 10 is fished by first pulling on the line 100 slowly until the lure 10 moves approximately a foot. As the line 100 is pulled, the coiled lure 10 unfurls into a generally flat position (see FIGS. 1, 2 and 7a). As soon as the forward movement applied to the lure 10 stops, the self-actuating motion of the lure 10 begins. With the preferred embodiment of the invention, the lure 10 is designed to continue to move for approximately ten seconds on its own in a way that resembles the movement of a live worm. The self-actuating motion begins as the extended portion of the head begins to rise quickly (due to its small radius shape memory and its generally thicker plastic which both provide a larger recoil force). In addition, the hinged segments 18a nearer the head 16 of the lure rise more quickly than the hinged segments 18b nearer the tail end 60 (see FIGS. 5, 6, and 7b). As the hinged segments 18b nearer the tail end catch up and rise above the other segments 18a, the hinged segments 18b exhibit a desirable wobbling motion as the recoil strength forces the broad surface of the top side 30 of the lure 10 through the water. As the tail 18 rises and curls forward, the tail 18 typically begins to slowly rotate and move in a lateral direction before finally curling into itself. This turning gives the lure a worm-like probing movement. Once the lure 10 stops moving on its own, it can be once again pulled slowly for a short distance, thereby repeating the process.

Figure 8:
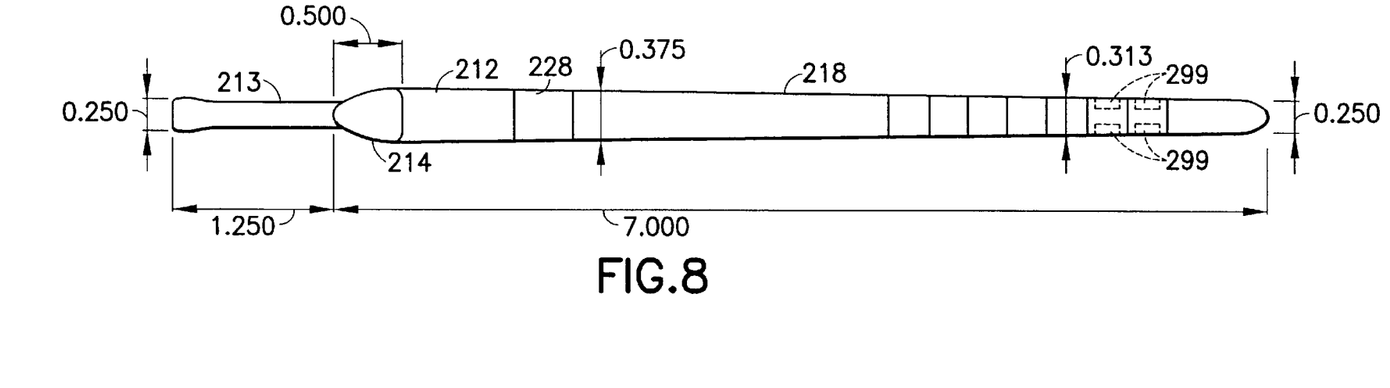
FIG. 8 is a top view of a second embodiment of the invention in a generally flattened state.
Figure 9:
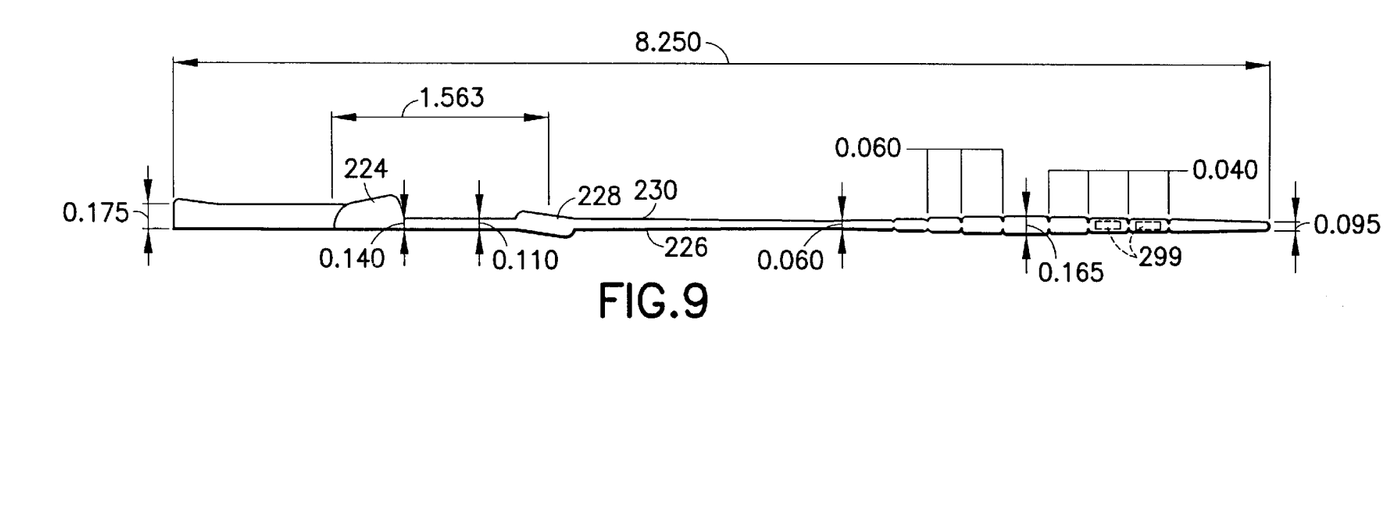
FIG. 9 is a side view of the second embodiment of the invention in a generally flattened state.

Turning now to FIGS. 8 and 9, a second embodiment of the invention is seen. Lure 210 of FIGS. 8 and 9 includes a head portion 212 and a tail portion 218 which are similar to the head portion 12 and tail portion 18 of the first embodiment of FIGS. 1–7c. Thus, only the differences will be discussed in detail. The head portion 212 of lure 210 has an integral weedguard 213 which extends forward from a tapered portion 214. The tapered portion 214 is preferably sufficiently thick so as to constitute a hook receiving or barb receiving portion 224 which protrudes from the top side 230 of the fishing lure 210. A second hook-receiving portion 228 is seen to protrude from both the top side 230 and bottom side 226 of the fishing lure.

The lure 210 of FIGS. 8 and 9 is approximately eight and one-quarter inches long, with the weed guard 213 being approximately one and a quarter inches long, the head being approximately one and three quarters inches long, and the tail being approximately five and a quarter inches long. The first two and a quarter inches of the tail has no hinges. As seen in FIG. 8, the head tapers in width from its widest point of about 0.400 inches to approximately 0.375 inches, and the tail tapers in width from approximately 0.375 inches to approximately 0.250 inches at the tail end. As seen in FIG. 9, the thickness of the head tapers from approximately 0.140 inches just after the first hook-receiving portion 224, to approximately 0.110 inches just before the second hook-receiving portion. The tail likewise tapers from approximately 0.075 inches from just after the second hook-receiving portion to approximately 0.060 inches adjacent the hinged portion of the tail. From there, the tail taperingly thickens out to a maximum of 0.165 inches, and then tapers back down to 0.095 inches at the end of the tail. The tail is formed with eight hinged segments. The thickness of the first four hinges is approximately 0.060 inches, while the thickness of the last four hinges is approximately 0.040 inches.

By comparing the dimensions of FIGS. 8 and 9, it will be appreciated that the width of the lure at any point along the head and tail portions 212, 218 is at least twice the thickness at the same point. This is true even along the thickened hinged portion of the tail, and particularly when comparing the width to the effective thickness of the tail (i.e., the thickness of the hinges).

A third embodiment of the invention is seen in FIGS. 10 and 11, where a lure 310 includes a head portion 312 and a tail portion 318. The head portion 312 is shown as being generally bulbous and therefore thick enough and long enough to accommodate an entire hook 392. As seen in FIG. 10, the lure 310 is molded with a turn or bend of approximately one hundred eighty degrees (as opposed to as a coil), and the width of the tail of the lure at any given location is at least twice the thickness at the same location. As shown, a portion 321 of the tail 318 adjacent the head in which the turn or bend is molded is very thin, and the tail tapers and increases in thickness in a second portion 323 of the tail. A final portion 325 of the tail tapers back down in thickness. The tail 318 of lure 310 does not include any hinges. As seen in FIG. 11, when the lure is pulled head-first through the water, the flexible tail 318 of the lure straightens (due to the flexibility of the tail and due to principles of fluid dynamics). When pulling of the lure through the water ceases, the tail rises because the lure 310 is made of a soft plastic which has a specific gravity less than water (i.e., it is buoyant) and because the lure wants to return to its original molded position (i.e., it has an elastic memory). As the tail of the lure continues to rise, the pre-molded one hundred eighty degree bend in the tail at portion 321, causes the tail 318 to extend over and beyond the head 312 (as indicated by the second phantom indication), thereby simulating the movement of a worm. It will be appreciated that with the provided arrangement, the lure will continue to move for several seconds (preferably at least seven, and more preferably at least ten) after pulling of the lure through the water ceases.

There has been described and illustrated herein several embodiments of a fishing lure which is manufactured as a coil or with a bend of at least approximately one hundred eighty degrees and a method of using the same. While particular embodiments of the invention have been described, it is not intended that the invention be limited thereto, as it is intended that the invention be as broad in scope as the art will allow and that the specification be read likewise. Thus, while particular riggings have been disclosed, it will be appreciated that other riggings may be used as well. In addition, while a particular types of plastic has been disclosed, it will be understood that other flexible materials can also be used. Also, while at least one generally bulbous hook receiving portion on the lure is preferred, it will be recognized that a fishing lure according to the invention can be designed without such a bulbous hook receiving portion. Also, while specific values for length, width, and thickness of various portions of different lures have been disclosed, it is understood that other lengths, widths, and thicknesses can be used as well. Moreover, while particular configurations having eight or seventeen hinged segments have been disclosed, it will be appreciated that any number of hinged segments (including no hinges as shown in one embodiment) could be used as well. It will therefore be appreciated by those skilled in the art that yet other modifications could be made to the provided invention without deviating from its spirit and scope as claimed.

What is claimed is:

1. A molded fishing lure for use with a hook and for fishing in water, comprising:
   a) a head portion which receives the hook; and
   b) a tail portion coupled to the head portion and together with said head portion substantially assuming the form of a worm, said tail portion having a thickness and a width, said width being at least twice the dimension of said thickness at substantially any location along said tail portion, wherein
   said head and tail portions, as molded, extend through at least one substantially three hundred sixty degree turn thereby defining a plane of coiling in which said tail portion coils in the water, with said thickness extending parallel to said plane and said width extending perpendicular to said plane.

2. A molded fishing lure according to claim 1, wherein:
said head portion and said tail portion as molded are formed as a coil making at least one complete circle of three hundred sixty degrees.

3. A molded fishing lure according to claim 2, wherein:
said tail portion as molded makes at least one complete circle of three hundred sixty degrees.

4. A molded fishing lure according to claim 1, wherein:
said head portion includes at least one bulbous portion adapted for receiving the hook.

5. A molded fishing lure according to claim 4, wherein:
said head portion includes a weed guard forward of said bulbous portion.

6. A molded fishing lure according to claim 4, wherein:
said head portion includes two bulbous portions separated by a thinner portion.

7. A molded fishing lure according to claim 6, wherein:
a first of said two bulbous portions is substantially adjacent said tail portion.

8. A molded fishing lure according to claim 7, wherein:
a second of the two bulbous portions comprises a first end of said fishing lure.

9. A molded fishing lure according to claim 8, wherein:
said second of said two bulbous portions tapers to a point.

10. A molded fishing lure according to claim 1, wherein:
said head portion has a first length, said fishing lure has a second length, and said first length is between ten and forty percent of said second length.

11. A molded fishing lure according to claim 1, wherein:
said fishing lure is molded out of soft plastic.

12. A molded fishing lure according to claim 11, wherein:
said fishing lure is comprised of material having a lower specific gravity than water.

13. A molded fishing lure according to claim 1, wherein:
said head portion has a relatively constant width.

14. A molded fishing lure according to claim 1, wherein:
said head portion tapers in width.

15. A molded fishing lure according to claim 1, wherein:
at least a portion of said head portion has a width which is at least as large as the largest width of said tail portion.

16. A molded fishing lure according to claim 15, wherein:
at least a portion of said head portion has a thickness which is at least as large as the largest thickness of said tail portion.

17. A molded fishing lure according to claim 1, wherein:
said tail portion has a top side, a bottom side, a first end coupled to said head portion, and a plurality of grooves on at least one of said top side and said bottom side.

18. A molded fishing lure according to claim 17, wherein:
said plurality of grooves include a plurality of grooves on said top side of said tail portion and a plurality of grooves on said bottom side of said tail portion, at least some of said plurality of grooves on said top side corresponding to at least some of said plurality of grooves on said bottom side to generate a plurality of hinges connecting a plurality of hinged segments.

19. A fishing lure according to claim 18, wherein:
a first of said plurality of hinges has a first thickness, and a second of said plurality of hinges has a second thickness different than said first thickness.

20. A fishing lure according to claim 18, wherein:
a first of said plurality of grooves on said top side has a first depth, and a first of said plurality of grooves on said bottom side which corresponds to said first of said plurality of grooves on said top side has a second depth, said second depth being different than said first depth.

21. A fishing lure according to claim 18, wherein:
each of said plurality of hinged segments has a segment thickness, and at least one of said plurality of hinged segments has a different segment thickness than at least one other of said plurality of hinged segments.

22. A fishing lure according to claim 21, wherein:
a first of said plurality of hinged segments closer to said head portion has a segment thickness which is smaller than a segment thickness of a second of said plurality of hinged segments further from said head portion.

23. A fishing lure according to claim 22, wherein:
a third of said plurality of hinged segments further from said head portion than said second of said plurality of hinged segments has a segment thickness which is smaller than said segment thickness of said second of said plurality of hinged segments.

24. A fishing lure according to claim 18, wherein:
each of said plurality of hinged segments has a segment length, and at least one of said plurality of hinged segments has a different segment length than at least one other of said plurality of hinged segments.

25. A fishing lure according to claim 1, further comprising:
c) a plurality of locking members coupled to said head portion and to said tail portion of said fishing lure, and securing said fishing lure such that said head portion forms at least a portion of a loop and said tail portion forms at least a second portion of a loop, said locking members being detached from said head portion and said tail portion prior to fishing thereby releasing said head portion and said tail portion from said loop.

26. A fishing lure for fishing in water, comprising:

a molded coiled plastic body substantially in the shape of a worm and having a width larger than its thickness and extending through at least one substantially three hundred sixty degree turn defining a plane of coiling, said plastic body having a lower specific gravity than the water and adapted such that when being dragged through the water said plastic body uncoils into a substantially flat elongate configuration with a longitudinal axis perpendicular to said width and perpendicular to said thickness, and said plastic body in said elongate configuration is adapted to assume a substantially untwisted configuration along said longitudinal axis.

27. A fishing lure for fishing in water, comprising:

a head portion and a tail portion, said fishing lure being formed of molded soft plastic and including means for permitting said fishing lure to assume a substantially flattened configuration when pulled through the water and for automatically causing said tail portion of said fishing lure, when said head portion is resting on a surface under the water and when the fishing lure is no longer pulled through the water, and over a period of time, to rise above said head portion and bend so that a first portion of said tail portion is behind said head portion, and so that a second portion of said tail portion extends in front of said head portion while forming a coil.

28. A fishing lure according to claim 27, wherein:

said means for permitting causes said lure to assume a coiled position over said period of time when no longer pulled through the water.

29. A fishing lure according to claim 28, wherein:

said period of time is at least five seconds.

30. A fishing lure for fishing in water, comprising:

a molded plastic body substantially in the shape of a worm and having a width larger than its thickness, and formed as a coil extending through at least one three hundred sixty degree turn that defines a plane of coiling in the water, said thickness extending parallel to said plane and said width extending perpendicular to said plane.

31. A fishing lure according to claim 30, wherein:

said molded plastic body includes with a hook-receiving portion of relatively larger thickness on an inner portion of said coil, and a tail portion on an outer portion of said coil.

32. A method of fishing, comprising:

a) obtaining a coiled fishing lure substantially in the shape of a worm and having a head portion and a tail portion which, as molded, extends through at least one substantially three hundred sixty degree turn thereby defining a plane of coiling in which said tail portion coils in the water, said tail portion having a thickness extending parallel to said plane of coiling and a width extending perpendicular to said plane of coiling, said width being substantially larger than said thickness at any location along said tail portion;

b) placing a hook coupled to a fishing line through the head portion;

c) casting the lure into water;

d) pulling the coiled cast fishing lure through the water until the coiled fishing lure uncoils into a substantially flattened position;

e) ceasing the pulling motion on the coiled fishing lure;

f) waiting a plurality of seconds for the generally flattened coiled fishing lure to return to its coiled shape; and g) repeating steps d) through f).

33. A molded fishing lure for use with a hook and for fishing in water, comprising:

a) a head portion which receives the hook; and b) a tail portion coupled to the head portion, said tail portion having a top side and a bottom side, a thickness defined as a distance between said top side and said bottom side and a width substantially defined across one of said top side and said bottom side, said width being larger than said thickness at substantially any location along said tail portion, wherein said tail portion includes a plurality of grooves on a top side of said tail portion and a plurality of grooves on a bottom side of said tail portion, at least some of said plurality of grooves on said top side corresponding to at least some of said plurality of grooves on said bottom side to generate a plurality of hinges connecting a plurality of hinged segments, said tail portion coiling in the water in a plane perpendicular to said grooves.

* * * * *